UNITED STATES PATENT OFFICE.

J. F. WISNEWSKI, OF CINCINNATI, OHIO.

IMPROVEMENT IN PREPARATIONS OF GLYCERINE.

Specification forming part of Letters Patent No. 25,072, dated August 9, 1859.

*To all whom it may concern:*

Be it known that I, J. F. WISNEWSKI, of Cincinnati, in the county of Hamilton and State of Ohio, have invented or discovered a new and useful Process for Manufacturing Glycerine; and I do hereby declare that the following is a full and clear description thereof.

The object of my invention is to produce pure glycerine from the refuse or waste water resulting from the manufacture of stearic acid, which is usually thrown away as useless; and the nature of my invention relates to the peculiar process by means of which I am enabled to extract or produce pure glycerine from said water, as hereinafter set forth and specified.

After the saponification of lard, grease, fat, or oils, either vegetable or animal, for the purpose of making stearic acid, I take the water that separates from the lime-soap, place it in a tub or tank lined with lead, and evaporate it by means of steam through a lead pipe to about 10° Baumé, and during this process of evaporation I mix with about eight hundred gallons of said water, weighing from 2° to 4° Baumé at 60° Fahrenheit, the following chemicals, viz: two pounds of chloride of lime, sixteen fluid ounces of sulphuric acid, eight pounds of ground tan-bark, and twenty gallons of fresh-burned pulverized charcoal. I then boil this mass down to about 10° Baumé, stirring it frequently to secure perfect mixture of the chemicals with the water. I then filter this mass through ground animal-charcoal (which must be previously well washed with clean hot water in order to free it from all soluble salts or other impurities) until the liquor of said mass runs colorless from said animal-charcoal. The filters used for this purpose should be of zinc. With about forty gallons of this liquor thus filtered I mix about four gallons of fresh-burned pulverized charcoal, from four to eight pounds of hydrate of alumina, (the quantity of alumina being varied according to the consistency of the mass,) and one-half an ounce of tannic acid. I then place this mass in a vacuum-pan and evaporate the same, at a temperature not to exceed the boiling-point "*in vacuo*" of the mass, down to about 26° Baumé at 140° Fahrenheit, which corresponds with about 28° or 29° Baumé at 60° Fahrenheit. This mass is then removed from the vacuum-pan and filtered through paper, the product of which filtration will be pure glycerine.

Should the water used for the manufacture of glycerine contain no iron, glue, or other nitrogen compounds, the chloride of lime, sulphuric acid, and tan-bark may be dispensed with in the first evaporation. Such cases, however, will occur but rarely.

The quantities of part or all said chemicals described in the foregoing process may be varied to some extent, according to the purity of the water with which they are to be used; but I prefer the quantities herein named, having fully demonstrated that preference by numerous practical experiments.

The object and effect for which the said chemicals are used may be set forth as follows: The chloride of lime, from which chlorine-gas is generated, is used partly to peroxidize any protoxide of iron that may be present and partly to destroy obnoxious effluvia; sulphuric acid to expel all the chlorine from the lime and to convert any surplus of lime or lime salts into insoluble sulphate of lime; charcoal to take up and retain mechanically such obnoxious gases as may not be removed by the chlorine; the tan-bark to precipitate the peroxide of iron, and also all the nitrogen compounds, glue, &c., as tannates; and the hydrate of alumina in the vacuum-pan, in combination with the charcoal and tannic acid, serves to retain the glycerine colorless and to precipitate any coloring-matter or any animal or vegetable impurities that may be formed after the filtration through animal-charcoal.

I do not wish to be understood as claiming any of the chemicals herein named when taken separately, as I am aware that they are in common use; but What I do claim as my invention or discovery, and desire to secure by Letters Patent, is—

The employment or use and introduction of the within-named chemicals in the relative quantities, manner, and combination herein described, for the purposes set forth.

In testimony of which invention I have hereunto set my hand.

J. F. WISNEWSKI.

Witnesses:
H. E. CLIFTON,
WM. A. PROCTER.